(12) United States Patent
Rajabizadeh et al.

(10) Patent No.: US 11,379,746 B2
(45) Date of Patent: Jul. 5, 2022

(54) METHODS OF PROCESSING AND GENERATING IMAGE DATA IN A CONNECTIONIST NETWORK

(71) Applicant: Aptiv Technologies Limited, St. Michael (BB)

(72) Inventors: Farzin G. Rajabizadeh, Wuppertal (DE); Narges Milani, Düsseldorf (DE); Daniel Schugk, Cologne (DE); Lutz Roese-Koerner, Remscheid (DE); Yu Su, Wuppertal (DE); Dennis Mueller, Moers (DE)

(73) Assignee: Aptiv Technologies Limited, St. Michael (BB)

(*) Notice: Subject to any disclaimer, the term of this patent is extended or adjusted under 35 U.S.C. 154(b) by 890 days.

(21) Appl. No.: 16/203,124

(22) Filed: Nov. 28, 2018

(65) Prior Publication Data

US 2019/0188586 A1    Jun. 20, 2019

(30) Foreign Application Priority Data

Dec. 18, 2017  (EP) .................................... 17208223

(51) Int. Cl.
*G06N 7/00*     (2006.01)
*G06N 3/08*     (2006.01)
(Continued)

(52) U.S. Cl.
CPC ............. *G06N 7/00* (2013.01); *G06N 3/0454* (2013.01); *G06N 3/08* (2013.01); *G06N 20/00* (2019.01);
(Continued)

(58) Field of Classification Search
CPC .......... G06N 7/00; G06N 3/0454; G06N 3/08; G06N 20/00; G06N 3/063; G06V 10/454; G06V 20/582; G06V 20/584; G06V 10/82
See application file for complete search history.

(56) References Cited

U.S. PATENT DOCUMENTS 9,076,228 B2 *  7/2015  Mochizuki ................ G06T 3/40
2017/0076179 A1  3/2017  Martineau et al.

OTHER PUBLICATIONS

Rodner, Erik, et al. "Fine-grained recognition in the noisy wild: Sensitivity analysis of convolutional neural networks approaches." arXiv preprint arXiv:1610.06756 (2016). (Year: 2016).*

(Continued)

*Primary Examiner* — Michael J Huntley
*Assistant Examiner* — Sehwan Kim
(74) *Attorney, Agent, or Firm* — Sawtooth Patent Group PLLC

(57) ABSTRACT

A method of processing image data in a connectionist network comprises a plurality of units, wherein the method implements a multi-channel unit forming a respective one of the plurality of units, and wherein the method comprises: receiving, at the data input, a plurality of input picture elements representing an image acquired by means of a multi-channel image sensor, wherein the plurality of input picture elements comprise a first and at least a second portion of input picture elements, wherein the first portion of input picture elements represents a first channel of the image sensor and the second portion of input picture elements represents a second channel of the image sensor; processing of the first and at least second portion of input picture elements separately from each other; and outputting, at the data output, the processed first and second portions of input picture elements.

12 Claims, 3 Drawing Sheets

(51) Int. Cl.
    G06N 3/04      (2006.01)
    G06N 20/00     (2019.01)
    G06V 10/44     (2022.01)
    G06V 20/58     (2022.01)

(52) U.S. Cl.
    CPC .......... G06V 10/454 (2022.01); G06V 20/582 (2022.01); G06V 20/584 (2022.01)

(56) References Cited

OTHER PUBLICATIONS

McCormac, John, et al. "Semanticfusion: Dense 3d semantic mapping with convolutional neural networks." 2017 IEEE International Conference on Robotics and automation (ICRA). IEEE, 2017. (Year: 2017).*

Silberman, Nathan, et al. "Indoor segmentation and support inference from rgbd images." European conference on computer vision. Springer, Berlin, Heidelberg, 2012. (Year: 2012).*

Noh, Hyeonwoo, Seunghoon Hong, and Bohyung Han. "Learning deconvolution network for semantic segmentation." Proceedings of the IEEE international conference on computer vision. 2015. (Year: 2015).*

Li, Hongguang, et al. "Image registration and fusion of visible and infrared integrated camera for medium-altitude unmanned aerial vehicle remote sensing." Remote Sensing 9.5 (2017): 441. (Year: 2017).*

Wang, Hongzhen, et al. "Gated convolutional neural network for semantic segmentation in high-resolution images." Remote Sensing 9.5 (2017): 446. (Year: 2017).*

Andrew G. Howard et al: "MobileNets: Efficient Convolutional Neural Networks for Mobile Vision Applications", Apr. 17, 2017, 10 pages.

Goodfellow, et al., "Generative Adversarial Nets", Jun. 2014, 9 pages.

Radford, et al., "Unsupervised Representation Learning with Deep Convolutional Generative Adversarial Networks", Jan. 7, 2016, 16 pages.

"Extended European Search Report", EP Application No. 17208223.2, dated Sep. 17, 2018, 11 pages.

"Foreign Office Action", EP Application No. 17208223.2, dated Jun. 22, 2020, 4 pages.

"Foreign Office Action", EP Application No. 17208223.2, dated Oct. 4, 2021, 4 pages.

* cited by examiner

METHODS OF PROCESSING AND GENERATING IMAGE DATA IN A CONNECTIONIST NETWORK

TECHNICAL FIELD OF INVENTION

The invention relates to methods of processing and generating image data in a connectionist network, in particular a neural network, comprising a plurality of units, each unit having a data input, a data output, and at least one processing parameter, wherein processing of input data by means of a respective one of the plurality of units is at least partially determined by the at least one processing parameter of the respective unit.

BACKGROUND OF INVENTION

Connectionist networks are known in the field of machine learning, which usually involves some sort of algorithmic training during which suitable values for the processing parameters are derived on the basis of training data. In general, connectionist networks as described herein can be employed for supervised and unsupervised machine learning including combinations thereof, i.e. semi-supervised machine learning. However, the term "connectionist network" should be understood broadly and also covers models, which are not per se known as models trained by machine learning.

A connectionist network is a mathematically inspired model that is made up of interconnected processing units, wherein a given unit may have incoming connections from, or outgoing connections to, many other units. Accordingly, each unit has at least one data input and at least one data output. A plurality of units can be arranged in subsequent layers and interconnected with each other, as is commonly known from artificial neural network design. The plurality of units of a given network can have the same or different structures. Sometimes groups of units are employed, wherein the units of a given group have a common pre-defined structure that may differ between groups. It is to be understood that a given unit can be configured to carry out many processing steps determined by a plurality of processing parameters. This may involve a plurality of different transformations of the data by means of linear or non-linear functions, which are sometimes referred to as activation functions in the context of neural network design. As the skilled person understands, a connectionist network is preferably implemented as software, which means that the network structures described herein are not representing hardware structures but electronically implemented methods, i.e. computer-implemented methods.

In general, connectionist networks can be employed for a wide variety of applications in which some sort of data processing is required. One application is image classification, which may involve classifying the content of an image or portions thereof into at least one of a plurality of pre-defined semantically meaningful groups. This is to say that image data acquired by means of an analog or digital image sensor is transformed into a discrete variable indicating a content or object class. In a traffic environment for example, a classifier can classify objects into one of the groups "vehicle", "pedestrian", and "unknown". Another classifier could be directed to traffic signs only, classifying the traffic signs with regard to their corresponding semantical meaning (traffic sign recognition).

One problem about connectionist networks in the above context of applications is their robustness, i.e. classifying a given image with high reliability into the correct class. It turned out that the complexity of the data material to be classified is difficult to cope with even when only a selection of objects is used, i.e. traffic signs. This problem is particularly virulent if the many different conditions (e.g., night-time and day-light) are taken into account under which, e.g., traffic signs will be imaged during normal operation of a vehicle throughout a year. This is to say that the large visual appearances due to illumination changes, partial occlusions, rotations, and weather conditions are difficult to cope with. In addition, it has to be noticed that usually a multi-channel image sensor will be used in a vehicle for acquiring images from the vicinity of the vehicle. Therefore, a plethora of picture elements need to be processed for classifying only a single image

SUMMARY OF THE INVENTION

In principle, even very complex classification tasks may be tackled with connectionist networks. However, as the classification task gets more complex usually also model complexity needs to be increased. This leads to the risk of overfitting of the network, i.e. the trained network is useful in order to obtain a good model performance on a given set of training data but may have severely deteriorated model performance on unseen test data. This needs to be avoided especially in safety-critical applications such as traffic sign detection and recognition, where the driver relies on a recognition result or where a driving behaviour of the vehicle is automatically adapted according to the recognition result.

In order to arrive at improved connectionist networks, generative adversarial networks (GANs) have been studied recently. These networks are typically built by two main models, the generator that synthesizes image data, and the discriminator that classifies the synthesized image data into two groups, namely "real" or "synthetic". In other words, the discriminator has to decide whether the input image represents a true image, i.e. taken by means of an image sensor from a true object, or whether the input image represents a synthesized image from the generator. Typically, the generator and the discriminator are trained together wherein an equilibrium of two conflicting objectives has to found. These conflicting objectives are the objective of the generator to mimic real images and the objective of the discriminator to reliably classify the input image correctly. During training there is—in a mathematical sense—a battle between the generator and the discriminator since the generator constantly tries to improve in fooling the discriminator, wherein the discriminator tries to improve in not being fooled by the generator. Although the discriminator trained in this way in conjunction with the generator should be more reliable it turned out that the resulting performance is still not satisfactory. At the same time, the images synthesized by a trained generator do still have significant visible differences to real sample images. This hinders a possible application of the generator to synthesize large amounts of training data which may be used for training other classifiers.

Described herein are improved methods of processing and generating image data in a connectionist network.

One embodiment is directed to the case of processing image data in a connectionist network, in particular neural network, comprising—as mentioned above—a plurality of units, each unit having a data input, a data output, and at least one processing parameter, wherein processing of input data by means of a respective one of the plurality of units is at least partially determined by the at least one processing parameter of the respective unit. The method implements a multi-channel unit forming a respective one of the plurality of units, and wherein the method comprises: receiving, at the data input, a plurality of input picture elements representing an image acquired by means of a multi-channel image sensor, wherein the plurality of input picture elements comprise a first and at least a second portion of input picture elements, wherein the first portion of input picture elements represents a first channel of the image sensor and the second portion of input picture elements represents a second channel of the image sensor; processing of the first and at least second portion of input picture elements separately from each other; and outputting, at the data output, the processed first and second portions of input picture elements.

It has been found that processing the input picture elements separately for each channel significantly improves the performance of the network, i.e. the network is capable to process the input data with improved accuracy in view of the desired task of the network, e.g., classifying the input data. This is to say that the input picture elements are split up into a number of groups corresponding to the number of channels of the image sensor with which the input picture elements have been acquired. This split-up of picture elements can be carried out with a predefined set of parameters which describe a predefined topology, i.e. pattern of the sensor elements of the image sensor. For example, the image sensor can be a Bayer (RGB) sensor (red, green, and blue channel) or a Foveon X3 sensor. Another example is the so called red-clear-clear-clear (RCCC) sensor which can be advantageously applied in automotive applications. This sensor type comprises a number of grey-channel sensor elements which is three times the number of red-channel sensor elements. Due to the different colour channels and the unequal resolution the resulting matrices of picture elements of each channel will usually have a rather dissimilar texture, e.g., due to a different frequency spectrum. Processing these groups of picture elements separately from each other allows for a much more appropriate processing compared to the case in which both groups of picture elements are processed at once, for example when combined in one three-dimensional matrix in which one group of picture elements is scaled to the other.

According to one embodiment the method further comprises combining the processed first and second portions of input picture elements (i.e. the output picture elements), wherein the combined first and second portions of input picture elements are outputted instead of the processed first and second portions of input picture elements. In this way, the multi-channel unit can be integrated into a connectionist network with a single-channel structure, i.e. the outputted data can be fed into one single data input of a subsequent unit of the connectionist network. To accomplish this, the processed first and second portions of input picture elements can be concatenated to from a three-dimensional matrix. For example, the processed versions of the first and second portions can be two-dimensional matrices of the same size which are concatenated in the third dimension.

As the case may be, the first and second portions of input picture elements can consist of an unequal number of picture elements (as in the case of the RCCC sensor), respectively, and wherein the processed first and second portions of input picture elements can consist of an equal number of picture elements. This is to say that each portion of the input picture elements is processed with an individual set of processing parameters configured to ensure an equal number of output picture elements. In this way, a subsequent interpolation of picture elements is not necessary. The individual sets of processing parameters can be manually predefined in the sense of hyper parameters or can be evaluated during training of the connectionist network, as will be explained further below.

The input picture elements do not have to be raw data from an image sensor. The input picture elements can also be pre-processed. For example, the first portion of picture elements corresponding to a grey channel of an RCCC sensor can be smoothed or complemented by interpolated picture elements so that a desired size of the first portion is achieved.

In one embodiment, processing of the first portion of input picture elements is carried out by means of at least a dedicated first one of the plurality of units and forming a first subunit of the multi-channel unit and wherein processing of the at least second portion of input picture elements is carried out by means of at least a dedicated second one of the plurality of units forming a second subunit of the multi-channel unit. In other words, the processing of the first and second portions of input picture elements is carried out by units of the connectionist network, i.e. the multi-channel unit can be formed by two units of the network. Therefore, the processing parameters for determining the processing behaviour of the (sub-) units can be learned, i.e. trained within the training procedure of the complete network and do not have to or even should not be manually set. The processing parameters can be at least partially formed by weights of a filter. Preferably, these weights are not "shared" between the two subunits. Therefore, the concept of weight sharing between subsequent units of the connectionist network is split up with regard to the multi-channel unit. This allows for a significant improvement of the performance of the network without having to (significantly) increase the model complexity. Preferably, for each channel only one subunit is used. However, in some cases it can be advantageous to use a plurality of subsequent subunits for each channel.

According to another embodiment the first subunit and the second subunit of the multi-channel unit are formed by a first and a second convolutional unit, respectively, wherein the first and second convolutional units each implement a convolution of at least some of the plurality of input picture elements received by the respective convolutional unit with a kernel filter. The use of kernel filters has been found to work very well in the context of the proposed multi-channel approach. The kernel filter can be a matrix having a dimension smaller than the input data and forming a filter mask that is convolved with the input data in the manner of a sliding window involving calculating scalar products, as is well known to those skilled in the art. The kernel filter is preferably determined by at least one processing parameter which can be a weight of the kernel filter evaluated during training of the network. The kernel filter can have the additional advantage of reducing the computational load of the processing. Preferably, all units of the network are convolutional units.

According to another embodiment processing of the plurality of input picture elements received by the first and second convolutional units comprises normalizing the results of the respective convolutions on the basis of a statistical analysis of a combination of the results of the respective convolutions, wherein the normalized results are subject to a nonlinear transformation. In particular, the normalization can be carried out with a so called batch normalization technique which is known in the field of neural network design. Such a normalization has been found to further improve the accuracy of the network without having to increase the model complexity. With regard to the nonlinear transformation, various such transformations are known from the art in the context of neural network activation functions, e.g., Tangens hyperbolicus, logistic function or the so-called leaky rectified linear unit (ReLu), which is defined as $f(x)=\max(s*x, x)$, with s preferably forming a hyper parameter and * denoting the scalar multiplication operator. Preferably, the latter function is used to transform the convolution results of the two subunits, preferably with the same value for s, e.g., s=0.2. This configuration has been shown to deliver a superior performance, in particular in connection with image data being acquired by means of a RCCC sensor.

Having regard to the overall structure of the connectionist network in a further embodiment, the multi-channel unit forms a first unit of the connectionist network, wherein the data outputted through the data output of the multi-channel unit is further processed by at least one subsequent unit of the connectionist network, wherein the data outputted by a last unit of the connectionist network comprises a discrete variable classifying the image represented by the plurality of input picture elements received by the first unit. Therefore, the network implements a classifier, wherein the multi-channel unit forms the first, i.e. the input unit of the network through which the network receives the image data to be classified. This has the advantage that the channel-specific processing is carried out first so that no previous units mix the individual channels. Furthermore, the input picture elements can easily be separated in view of their individual processing. The position of the multi-channel unit being first in the network has also the effect that the extraction of low-level image details is assigned to the multi-channel unit wherein abstract higher-level semantics are extracted in subsequent units, which share the information of the channels. Preferably, the network comprises four units including the multi-channel unit (the two subunits counted as one unit).

In view of the wide range of possible applications, it has been found that the connectionist network is particularly suited to implement a classifier for traffic signs. In a basic version, this can be a binary classifier indicating whether or not the image represents a true image of a traffic sign or not. Following a basic classification, those images which have been verified as true images of traffic signs can be further analysed, e.g., by means of a specialized classifier identifying their semantic content. As an alternative or additional to a binary classifier, the network can be configured to implement a classifier outputting one or more discrete variables identifying a plurality of labels, e.g., labels corresponding to individual traffic signs (e.g., "maximum velocity 80 km/h" or "overtaking prohibited", which can be identified by means of a so-called "one-hot" vector, e.g., for two different labels the vector can be [0, 0, 0, 1] and [0, 0, 1, 0], respectively). This can be accomplished by using an amount of labelled training data during training of the network. Usually, this training data is additional to an amount of unlabelled training data (real images of traffic signs without class label), i.e. the network is trained in a semi-supervised fashion. In this way, the network can be configured to carry out a full-blown classification of traffic signs optionally including a verification of the overall class. In other words, the network can implement a traffic sign detection and/or recognition. Of course, this is only exemplary and it has to be understood that the network may be used for other purposes as well, e.g., detection of pedestrians and other objects relevant in the context of driving, in particular autonomous driving applications.

Alternatively, or additionally to a classification, the connectionist network allows to output continuous variables which may be derived in an unsupervised manner and which can be suitable to describe certain properties of the input data such as properties related to the visual appearance, e.g. illumination and scale of the image represented by the picture elements. In other words, the connectionist network can be configured to implement a description of the input data by means of one or more continuous variables. This can be accomplished within the scope of extracting higher semantic information in units subsequent to the multi-channel unit, wherein the subsequent units "share" information of the channels.

The method of generating image data in a connectionist network, in particular neural network, comprises—corresponding to the connectionist network for processing image data—a plurality of units, each unit having a data input, a data output, and at least one processing parameter, wherein processing of input data by means of the unit is at least partially determined by the at least one processing parameter of the unit, wherein the method implements a multi-channel unit forming a respective one of the plurality of units, and wherein the method comprises: receiving, at the data input, a plurality of input picture elements representing a raw image; processing of the plurality of input picture elements with a first set of processing parameters, wherein the processing with the first set of processing parameters gives a first portion of output picture elements, wherein the first portion of output picture elements represents a first channel of a multi-channel image sensor; processing of the plurality of input picture elements with at least a second set of processing parameters, wherein the processing with the second set of processing parameters gives at least a second portion of output picture elements, wherein the second portion of output picture elements represents a second channel of the multi-channel image sensor; outputting, at the data output, the first and second portions of output picture elements representing an image acquired by means of the multi-channel image sensor.

As described in connection with the solution according one embodiment, the method of generating image data comprises a step of separate processing. However, the split-up into at least two channels is now performed by the multi-channel unit, i.e. one set of data is processed in two different ways resulting in two differently processed versions of the data. In the method of processing image data, the split-up is inherent to the input data, i.e. the input data comprises at least two different groups corresponding two sensor channels. In the case of generating image data, these groups have to be synthesized. However, since both methods exploit a separate processing, the two methods are interconnected by a single inventive concept.

As the skilled person understands, both methods represent methods for processing image data. However, the second method of generating image data is denoted as "generating method" in order to better distinguish the method to the method of (merely) processing.

Optionally, the first and second portions of output picture elements are combined prior to outputting them. In this way, the data can be further processed by one or more units which comprise only one data input. However, it is also possible to process the data further by separate units.

Having regard to the discussion of differently sized sensor channels above, the first and second portions of output picture elements can consist of an unequal number of picture elements, respectively. The input picture elements can thus be processed with an individual set of processing parameters configured to ensure a predefined and individual number of output picture elements for each channel. In this way, for example, a physical number of sensor elements can be directly synthesized by means of the method. Preferably, the processing of the plurality of input picture elements with the first set of processing parameters is carried out by means of at least a dedicated first one of the plurality of units and forming a first subunit of the multi-channel unit and wherein the processing of the plurality of input picture elements with the second set of processing parameters is carried out by means of at least a dedicated second one of the plurality of units and forming a second subunit of the multi-channel unit. As described before, the dedicated units are preferably part of the training of the network and thus are not manually set.

In another embodiment the first subunit and the second subunit are formed by a first and a second deconvolutional unit, respectively, wherein the first and second deconvolutional units each implement a deconvolution, i.e. transpose convolution of at least some of the plurality of input picture elements received by the respective deconvolutional unit with a kernel filter. Preferable, all units of the network are deconvolutional units.

Having regard to a specific configuration of the network for generating image data, the network can be configured such that a first unit of the network receives, as input data, random noise, wherein the noise is processed by the first unit and is then further processed by at least one subsequent unit of the connectionist network, wherein the multi-channel unit forms a last unit of the connectionist network. The first and last unit may also be denoted as input and output unit, respectively. It is to be noted that this configuration is the reversed order than in the case described above in connection with the method of processing image data. In this way, the separated processing branches can be connected to a subsequent network for processing image data, which is also beneficial in view of training of the network. Furthermore, the position of the multi-channel unit being last in the network has the effect that the generation of low-level image details is assigned to the multi-channel unit wherein abstract higher-level semantics are generated in previous units, which share information of the channels of the multi-channel unit. Preferably, the network comprises four units including the multi-channel unit (the two subunits counted as one unit).

Features presented with regard to one of the two networks types (processing and generating image data) may be realized in the other network type in the same fashion.

The invention also relates to a method of training a connectionist network, in particular neural network, comprising generating image data according to at least one of the embodiments of the method of generating image data; and processing the generated image data according to at least one of the embodiments of processing image data, wherein the connectionist network is trained by means of a gradient-descent algorithm (i.e., backpropagation) comprising modifying the at least one processing parameter of at least some of the plurality of units of the connectionist network. In other words, the connectionist network can comprise two (sub-) networks, one for generating image data, and the other for processing the data, e.g., in order to arrive at a classification. This corresponds to a setup of a generative adversarial network, which can also be denoted as a combined network. Preferable the output of the multi-channel unit of the generative network part is directly connected to the subsequent processing network part. The training of the networks can be carried out periodically, for example in a vehicle comprising an image sensor. This can be useful in view of the huge amount of training data which is collected by the vehicle during normal operation of the vehicle.

In a particular example, the "generation network" can be configured to generate image data with respect to discrete and/or continuous variables forming parameters of the image data to be generated. For example, after training the network as a combined network the generation network can be configured with continuous variables "scale", "background illumination" and "overall illumination". In this way, it is possible to generate specifically parameterized image data which can be used to test and/or train other classifiers. In addition the "processing network" can be configured to output an estimation of the continuous variables which may be used in further processing of the image data in a vehicle. It is understood that the use of additional units sharing information of both channels in both subnetworks allows to built up more potential processing capabilities going beyond a simple classification.

It is understood that the generative network and the processing network can be used as individual networks and can in principle also be trained separately from each other by means of a gradient-descent algorithm.

The invention further relates to a vehicle with at least one multi-channel image sensor for acquiring an image comprising a plurality of picture elements, wherein the vehicle comprises a processing unit configured to carry out the method according to at least one of the embodiments of the method of processing image data as described above, wherein the method is carried out on the basis the plurality of picture elements. The multi-channel image sensor preferably comprises a red-clear-clear-clear sensor. The processing unit may comprise or be connected to a storage device in which instructions for carrying out the method are stored. This can also comprise a plurality of (trained) processing parameters which determine the processing of the network. These processing parameters may be updated by way of a new training of the network, which may be carried out in the processing unit or in a central server which is connected to the vehicle.

The processing unit of the vehicle may be further configured to modify operation of the vehicle with respect to the processed data. In an example, the classification result of the image data, e.g., of a traffic sign, may be visually or acoustically presented to a driver of the vehicle or may be automatically used to adapt a driving vehicle in an autonomous driving application, e.g. regulating a speed of the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
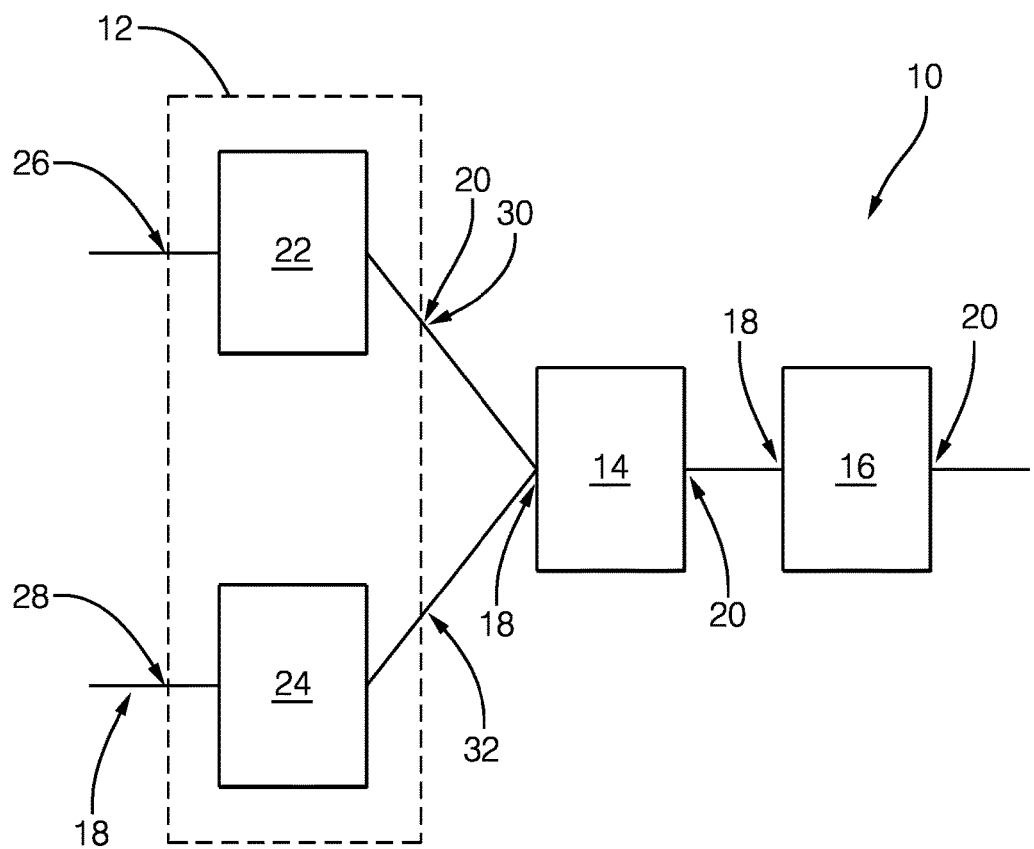
FIG. 1 is a schematic illustration of a connectionist network for processing image data.

A connectionist network 10 is shown in FIG. 1 and comprises a plurality of units 12, 14, 16. One of the units, namely unit 12 forms a multi-channel unit of the network 10. Each of the units 12, 14, 16 has a data input 18 and a data output 20. The multi-channel unit 12 is the first unit of the network 10, wherein the data output 20 is connected to the data input 18 of the subsequent unit 14, and wherein the data output 20 of the subsequent unit 14 is connected to the data input 18 of the last unit 16. The multi-channel unit 12 comprises a first subunit 22 and a second subunit 24, which both can be of the same type as the units 14, 16. Accordingly, the data input 18 of the multi-channel unit 12 comprises a first data input 26, a second data input 28, a first data output 30, and a second data output 32

Figure 2:
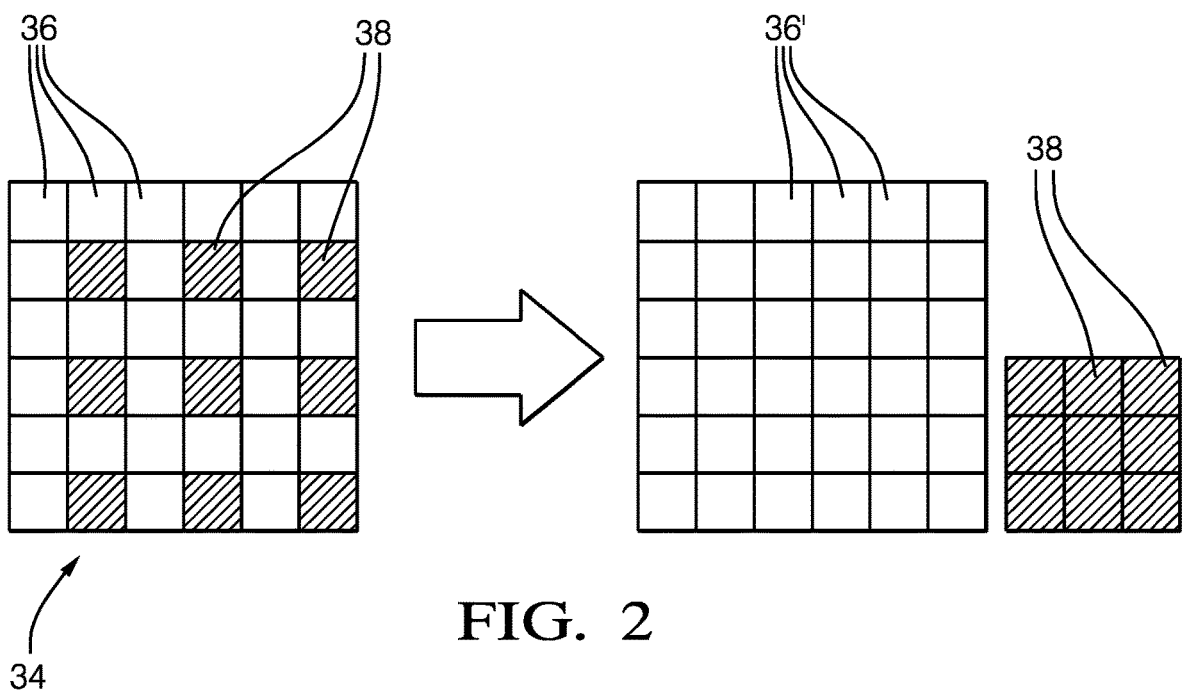
FIG. 2 is an illustration of a separation of two channels of a red-clear-clear-clear image sensor.

The input data for the network 10 from FIG. 1 can be an image composed of a plurality of picture elements of a multi-image sensor (not shown). This is illustrated in FIG. 2 on the left side schematically showing a pattern 34 of an RCCC sensor. As can be seen, the pattern 34 comprises a first portion of picture elements 36 and a second portion of picture elements 38 representing a first channel ("grey") and a second channel ("red") of the image sensor, respectively. The first and second portions 36, 38 of picture elements—without any preprocessing—can be inputted to the multi-channel unit 12 via the first and second data inputs 26, 28, respectively. Preferably, the first portion of picture elements 36 is preprocessed such that the "missing" picture elements of the second portion 38 are interpolated from the first portion 36. This is illustrated on the right side of FIG. 2, which shows the preprocessed version 36' of the first portion 36 and the second portion 38 next to each other.

The first and second portions 36', 38 can be processed by means of the multi-channel unit 12, wherein the processed data outputted through the first and second output 30, 32 can be combined, e.g. concatenated before inputted into the subsequent unit 14.

Figure 3:
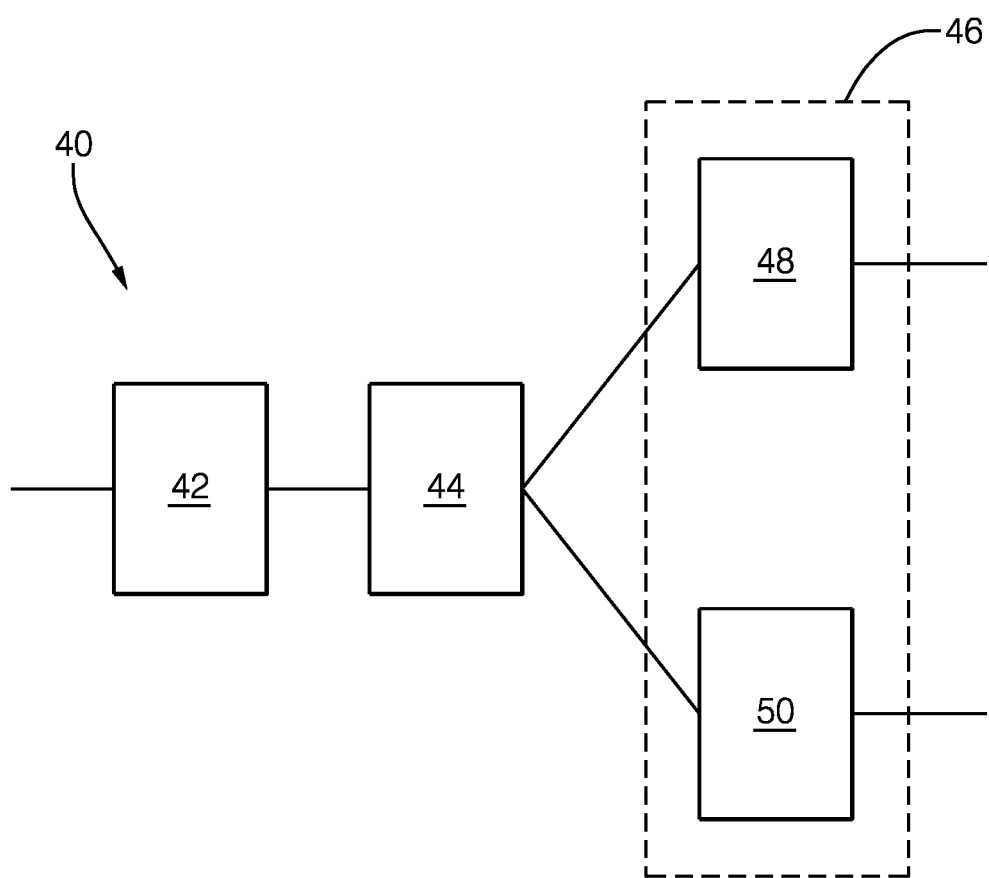
FIG. 3 is a schematic illustration of a connectionist network for generating image data.

FIG. 3 illustrates a connectionist network 40 with a plurality of units 42, 44, 46 from which the last unit 46 forms a multi-channel unit with a first subunit 48 and a second subunit 50. The network 40 can be interpreted as a reverse case of the network 10 of FIG. 1. However, the network 40 receives preferably random noise at the data input 18 of the first unit 42 and the first and second subunits 48, 50 output first and second portions of output picture elements which may be similar to the preprocessed first portion of picture elements 36' and the second portion of picture elements 38 of FIG. 2. In this way, the network 40 is a generator of image data which is complementary to the network 10. As the skilled person understands, the units 42, 44, 48, and 50 are interconnected in a similar fashion as in the network 10. Furthermore, it is emphasized that the number of units can vary and be adapted for a specific application.

Figure 4:
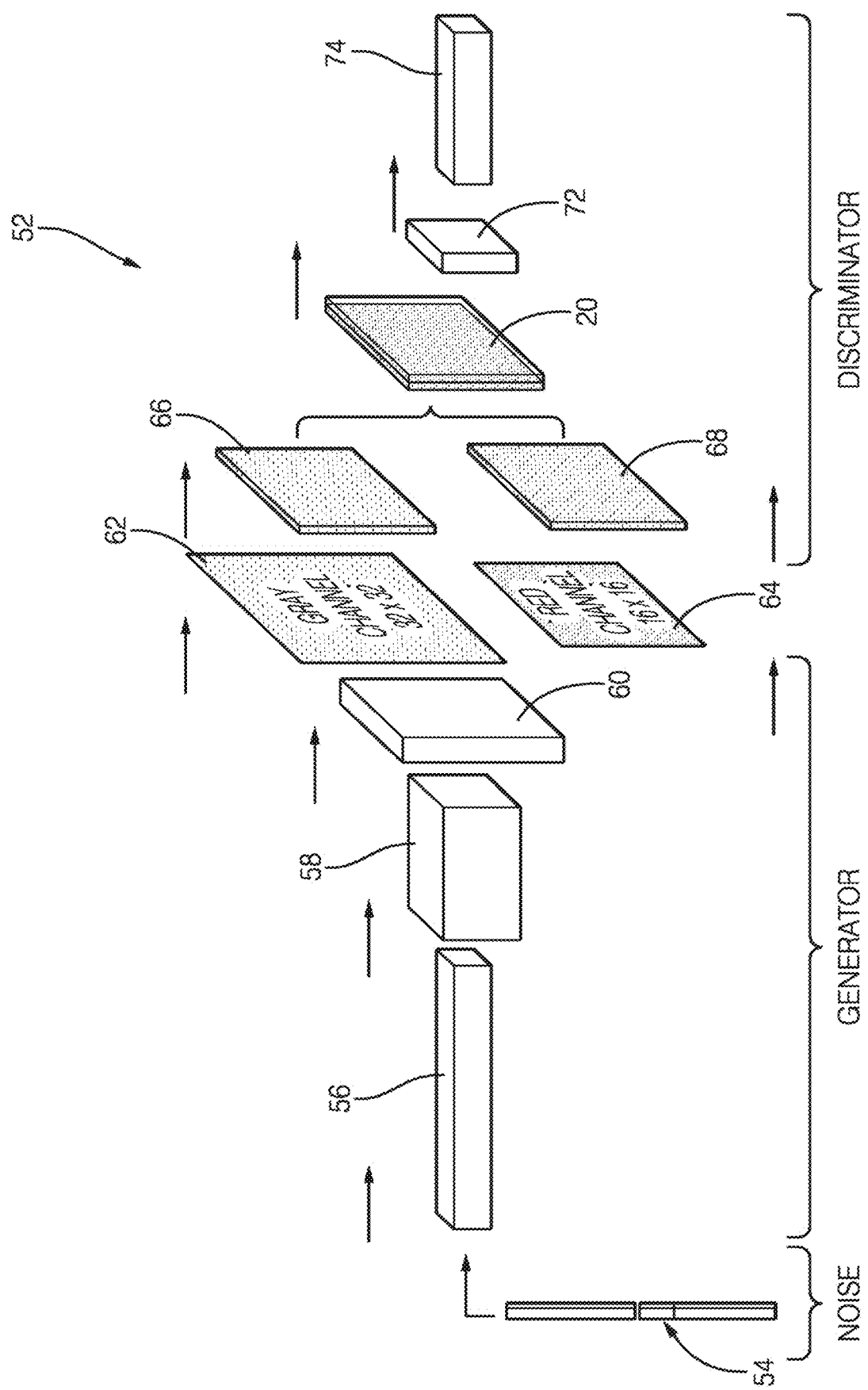
FIG. 4 is a schematic illustration of a connectionist network for processing and generating image data.

FIG. 4 is a schematic of a combined network 52 comprising a generator and a discriminator (i.e. classifier). The generator corresponds to a network of the type shown in FIG. 3. The discriminator corresponds to a network of the type shown in FIG. 1. A noise vector 54 can be inputted into the generator. The noise vector 54 can have a predefined size which can be adapted to a desired output of the discriminator, e.g. discrete and continuous variables. Data blocks 56, 58, which may be three-dimensional matrices of picture elements, indicate data outputted by two subsequent units, such as, e.g., the units 42, 44 of FIG. 3. A data block 60 indicates the result of a further unit (not shown). Each unit implements a deconvolution of the input data determined by different sets of processing parameters. The data slices 62, 64 (which may be two-dimensional matrices with unequal size as indicated in FIG. 4) are the result of a separate processing by means of two subunits, such as the subunits 48, 50 of FIG. 3, wherein the processing of each of the subunits is determined by a different set of processing parameters. The data slices 62, 64 are then inputted into the discriminator which may be denoted a classifier for the image represented by the data slices 62, 64. Two dedicated subunits of the discriminator, such as the subunits 22, 24 from FIG. 1 are then used to process the data slices 62, 64 and to output the equally sized data slices 66, 68. These data slices 66, 68 are then concatenated to form a data block 70, wherein further processing results in the blocks 72 and 74. The data block 74 may then be further processed to a finally desired output variable of the discriminator, which may be a binary variable or a discrete variable with more than two label dimensions.

The combined network 52 may be used during joint training of the generator and the discriminator in a fashion similar to a generator adversarial network described further above. The separate processing of channel-associated picture elements as indicated by the slices 62, 64, 66, and 68 leads to a better performance of both the generator and the discriminator.

While this invention has been described in terms of the preferred embodiments thereof, it is not intended to be so limited, but rather only to the extent set forth in the claims that follow.

We claim:

1. A method of processing image data in a neural network for classifying traffic signs that comprises a plurality of units, each unit having a data input, a data output, and at least one processing parameter, wherein processing of input data by means of a respective one of the plurality of units is at least partially determined by the at least one processing parameter of the respective unit, wherein the method implements a multi-channel unit forming a respective one of the plurality of units, the multi-channel unit forming a first unit of the neural network, and wherein the method comprises:

receiving, at the data input, a plurality of input picture elements representing an image acquired by means of an image sensor with multiple channels, wherein the plurality of input picture elements comprise a first portion and at least a second portion of input picture elements, wherein the first portion of input picture elements represents a first channel of the image sensor and the at least second portion of input picture elements represents a second channel of the image sensor, the first portion and the at least second portion of input picture elements consisting of an unequal number of picture elements, the image sensor being a red-clear-clear-clear sensor;

processing of the first portion and the at least second portion of input picture elements separately from each other; and outputting, at the data output, the processed first portion and at least second portion of input picture elements, the processed first portion and at least second portion of input picture elements consisting of an equal number of picture elements, the processed first portion and at least second portion of input picture elements being further processed by at least one subsequent unit of the neural network and data output by a last unit of the neural network comprising a discrete variable classifying the image represented by the plurality of input picture elements received by the first unit.

2. The method according to claim 1, wherein:
the method further comprises combining the processed first portion and at least second portion of input picture elements; and
the combined first portion and at least second portion of input picture elements are output instead of the processed first portion and at least second portion of input picture elements.

3. The method according to claim 1, wherein:
processing of the first portion of input picture elements is carried out by means of at least a dedicated first one of the plurality of units and forming a first subunit of the multi-channel unit, and
processing of the at least second portion of input picture elements is carried out by means of at least a dedicated second one of the plurality of units forming a second subunit of the multi-channel unit.

4. The method according to claim 3, wherein the first subunit and the second subunit are formed by a first convolutional unit and a second convolutional unit, respectively, wherein the first convolutional unit and the second convolutional unit each implement a convolution of at least some of the plurality of input picture elements received by the respective convolutional unit with a kernel filter.

5. The method according to claim 4, wherein processing of the plurality of input picture elements received by the first convolutional unit and the second convolutional unit comprises normalizing results of the respective convolutions using a statistical analysis of a combination of the results of the respective convolutions, wherein the normalized results are subject to a nonlinear transformation.

6. The method according to claim 1, wherein the neural network is trained by means of a gradient-descent algorithm that comprises modifying the at least one processing parameter of at least some of the plurality of units of the neural network.

7. A vehicle comprising:
at least one image sensor with multiple channels for acquiring an image comprising a plurality of input picture elements, the image sensor being a red-clear-clear-clear sensor, the plurality of input picture elements comprising a first portion and at least a second portion of input picture elements, wherein the first portion of input picture elements represents a first channel of the image sensor and the at least second portion of input picture elements represents a second channel of the image sensor, the first portion and the at least second portion of input picture elements consisting of an unequal number of picture elements; and
a non-transitory storage device comprising instructions that, when executed by a processor, cause the processor to classify traffic signs, the non-transitory storage device comprising a neural network that comprises a plurality of units, each unit having a data input, a data output, and at least one processing parameter, wherein processing of input data by means of a respective one of the plurality of units is at least partially determined by the at least one processing parameter of the respective unit, the processor implements a multi-channel unit forming a respective one of the plurality of units, the multi-channel unit forming a first unit of the neural network, the processor configured to:
receive, at the data input, the plurality of input picture elements;
process the first portion and the at least second portion of input picture elements separately from each other; and
output, at the data output, the processed first portion and at least second portion of input picture elements, the processed first portion and at least second portion of input picture elements consisting of an equal number of picture elements, the processed first portion and at least second portion of input picture elements being further processed by at least one subsequent unit of the neural network and data output by a last unit of the neural network comprising a discrete variable classifying the image represented by the plurality of input picture elements received by the first unit.

8. The vehicle according to claim 7, wherein the processor is further configured to combine the processed first portion and at least second portion of input picture elements, the combined first portion and at least second portion of input picture elements being output instead of the processed first portion and at least second portion of input picture elements.

9. The vehicle according to claim 7, wherein:
processing of the first portion of input picture elements is carried out by means of at least a dedicated first one of the plurality of units and forming a first subunit of the multi-channel unit, and
processing of the at least second portion of input picture elements is carried out by means of at least a dedicated second one of the plurality of units forming a second subunit of the multi-channel unit.

10. The vehicle according to claim 9, wherein the first subunit and the second subunit are formed by a first convolutional unit and a second convolutional unit, respectively, wherein the first convolutional unit and the second convolutional unit each implement a convolution of at least some of the plurality of input picture elements received by the respective convolutional unit with a kernel filter.

11. The vehicle according to claim 10, wherein processing of the plurality of input picture elements received by the first convolutional unit and the second convolutional unit comprises normalizing results of the respective convolutions using a statistical analysis of a combination of the results of the respective convolutions, wherein the normalized results are subject to a nonlinear transformation.

12. The vehicle according to claim 7, wherein the neural network is trained by means of a gradient-descent algorithm that comprises modifying the at least one processing parameter of at least some of the plurality of units of the neural network.

* * * * *